J. C. & W. J. POPE.
CLUTCH.
APPLICATION FILED JULY 20, 1908.
905,097.
Patented Nov. 24, 1908.
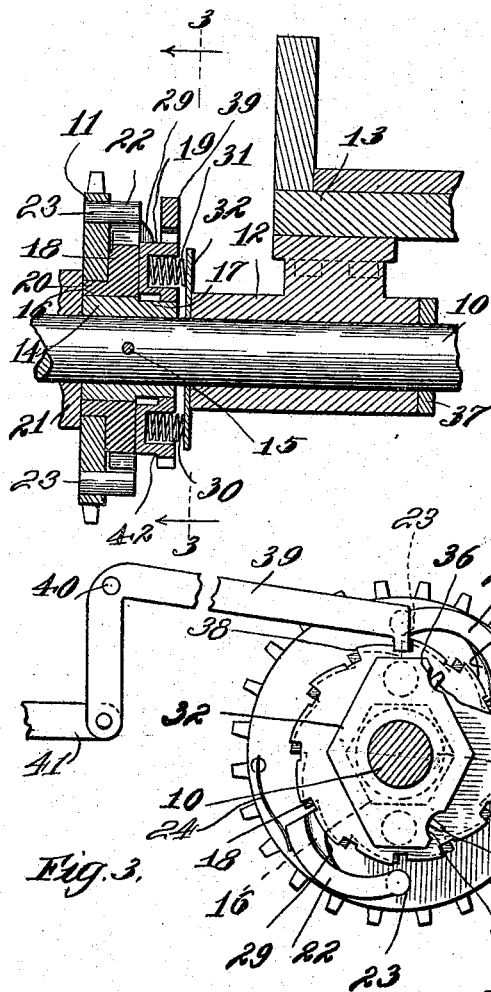
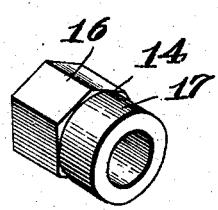
Witnesses
Inventors.
John C. Pope
William J. Pope
By Gibson & Gibson
Attys

UNITED STATES PATENT OFFICE.

JOHN C. POPE AND WILLIAM J. POPE, OF PLANO, ILLINOIS.

CLUTCH.

No. 905,097.   Specification of Letters Patent.   Patented Nov. 24, 1908.

Original application filed October 18, 1907, Serial No. 398,065. Divided and this application filed July 20, 1908.
Serial No. 444,440.

*To all whom it may concern:*

Be it known that we, JOHN C. POPE and WILLIAM J. POPE, citizens of the United States, and residents of Plano, county of Kendall, and State of Illinois, have invented certain new and useful Improvements in Clutches, of which the following is a specification and which are illustrated in the accompanying drawings, forming a part thereof.

The invention relates to clutches and has been divided out of our co-pending application for patent on manure spreaders, filed October 18, 1907, Serial No. 398,065.

The object of this invention is to provide improved means for detachably connecting rotating parts for the transmission of power.

When great power is transmitted from one rotating part to another through such a clutching device for connecting the parts as has been heretofore constructed, the parts of the clutch become so interlocked or engage each other with so much friction that so much force is required to separate them or otherwise effect their relative adjustment to interrupt the transmission of the power as to render this separation or adjustment exceedingly difficult and sometimes impossible of accomplishment by manual means. To overcome this objectionable feature in clutches constitutes a part of the object of this invention and to that end the invenion contemplates a clutch mechanism for the transmission of power from one rotating part to another where in the separation of the parts of the clutch for interrupting the transmission of power while being manually controlled, nevertheless results from a relative movement of the parts affected by the driving member of the clutch.

In the accompanying drawings:—Figure 1 is a central sectional view of mechanism embodying the invention. Fig. 2 is a front view of same, Fig. 3 is a sectional view taken on the lines 3—3 of Figs. 1 and 2, Figs. 4 and 5 illustrate details of the mechanism shown in Figs. 1, 2 and 3 separated from other parts.

The clutch mechanism as illustrated in the drawings is designed for detachably connecting a driving shaft 10 and a sprocket wheel 11. As in our herein before mentioned application for patent filed October 18, 1907, Serial No. 398,065, the shaft 10 may be the rear axle of a manure spreading machine. As shown this shaft turns in a bearing bracket 12 rigidly secured in place on the under side of a member 13 which in the said manure spreading machine may be the floor of the wagon box or hopper.

Preferably a bushing 14, shown in detail in Fig. 5 of the drawings, is secured in position on the shaft 10 adjacent one end of the bearing 12, as by means of a pin 15. As shown the body of this bushing is of polygonal form for a portion of its length, as indicated at 16, Fig. 5, and circular throughout the remaining portion of its length, as at 17 Fig. 5. The polygonal portion 16 of the bushing 14 provides a seat for a ratchet wheel 18 whereby the ratchet wheel is fixed against rotation on the shaft 10. The circular portion 17 of the sleeve 14 provides a bearing seat for a cam plate 19 shown in detail in Fig. 4 of the drawings.

The sprocket wheel 11 is preferably coaxially mounted with the driving shaft 10. As shown in the drawing it has a bearing seat upon a circular hub 20 formed upon one side of the ratchet wheel 18 and is fixed against longitudinal displacement on the hub by a collar 21 applied to the shaft adjacent the end of the bushing 14 and of sufficient diameter to engage a portion of the face of the sprocket wheel. Driving connection between the shaft 10 and the sprocket wheel 11 is effected by pawls 22, two of which are shown, carried by the sprocket wheel 11 and adapted to engage the teeth of the ratchet wheel 18. These pawls are each pivotally secured to the face of the sprocket wheel as at 23, and they are yieldingly held in contact with the teeth of the ratchet wheel 18 by leaf springs 24 carried by the sprocket wheel.

The cam plate 19 is provided for lifting the pawls 22 out of engagement with the ratchet wheel 18 when it is desired to interrupt the driving connection between the shaft 10 and the sprocket wheel 11. To this end, as shown, each of the pawls 22 is provided with a lug 29 which overhangs the side of the ratchet wheel 18 and the cam plate 19 has formed upon the face adjacent the ratchet wheel, a plurality of cam blocks 25, 26, 27, 28 for engaging the lugs 29. Each of the cam blocks 25, 26, 27, 28 has an inclined cam face 43 for engaging the lugs 29 to lift the pawls and the cam blocks are so spaced about the face of the cam plate 19 as to leave recesses 42 between the blocks for receiving the lugs 29 to permit the pawls 22 to engage the teeth of the ratchet wheel 18.

The lifting of the pawls 22 is effected by relative movement between the sprocket wheel 11 and the cam plate 19, the cam plate being rotated with the shaft 10 and the ratchet wheel 18 when it is desired to drive the sprocket wheel 11, and being brought to rest when it is desired to interrupt the driving connection between the driving shaft and the sprocket wheel. As shown the cam plate 19 is rotated by a frictional contact with the face of the ratchet wheel 18, the frictional engagement between these parts being insured by springs 30 and 31 reacting between the cam plate 19 and a washer 32 surrounding the shaft 10 and bearing against the face of the journal bracket 12. Preferably the washer 32 is turned with the cam plate 19 a rotating connection between these parts being effected by lugs 33 and 34 projecting from the face of the cam plate and entering suitable recesses 35, 36 formed in the margins of the washer 32.

Mechanism carried by the shaft 10 beyond the journal bracket 12 serves by engaging the bracket to prevent the springs 30 and 31 from producing a longitudinal movement of the shaft 10. As shown in the drawings a collar 37 is applied to the shaft 10 adjacent that end of the journal bracket remote from the washer for this purpose.

For arresting the rotation of the cam plate 19 a plurality of cogs or teeth 38 are formed upon its periphery and a stop arm 39 pivotally secured at 40 to a fixed support is adapted to be moved into or out of the path of the teeth 38.

When the parts are in position illustrated in Fig. 3 of the drawings, wherein the pawls 22 are held out of contact with the teeth of the ratchet wheel 18 by reason of the engagement of one of the cam blocks 25, 26, 27, 28 formed on the cam plate 19 with each of the lugs 29, the cam plate 19 being held against rotation by the engagement of the stop arm 39 with one of the cogs or teeth formed upon its periphery, the shaft 10 and the ratchet wheel 18 fixed thereto will rotate without turning the sprocket wheel 11. Driving connection between these parts may, however, be instantly established by raising the stop arm 39 out of contact with the teeth 38 of the cam plate 19, for as soon as the cam plate 19 is released it will rotate with the driving shaft 10 and ratchet wheel 18 by reason of the frictional engagement of the cam plate with the ratchet wheel. Rotation of the cam plate 19 through a small angle will bring one of the recesses 42 provided between each of the cam blocks 25, 26, 27, 28 into register with each lug 29 formed on the pawls 22, thus permitting the pawls to be depressed by the springs 24 into engagement with the teeth of the ratchet wheel 18. All of the rotating parts of the mechanism will now turn together until the stop arm 39 is again depressed into the path of the teeth or cogs 38 formed upon the periphery of the cam plate 19. When the movement of the cam plate 19 has been arrested in this way connection between the shaft 10 and the ratchet wheel 11 will be interrupted as soon as the sprocket wheel has been turned a sufficient distance in advance of the cam plate to cause the pawls 22 to be lifted out of engagement with the teeth of the ratchet wheel 18 by contact of the lugs 29 formed on the pawls with the inclined surfaces 43 of the cam blocks 25, 26, 27, 28 formed on the cam plate 19. The driving shaft 10 and ratchet wheel 18 will then turn independently of the sprocket wheel 11 and cam plate 19.

The movement of the stop arm is easily effected and may be readily accomplished by hand, a hand lever (not shown) being conveniently connected to the stop arm by a link 41. The shifting of the pawls 22 out of engagement with the teeth of the ratchet wheel 18, which may require considerable force when great power is being transmitted through the mechanism by reason of the friction caused by pressure of the ratchet teeth upon the ends of the pawls, is effected by a continued rotation of the driving shaft 10 when the movement of the cam plate 19 has been arrested. The force required for lifting the pawls is therefore provided by the driving power itself.

The invention is applicable to machines of various kinds and will be found particularly useful in agricultural machines wherein the moving parts are driven from the carrying wheels, driving connections between the wheels and other moving parts of such machines being preferably interrupted when the machine is to be transported from place to place.

We claim as our invention:—

1. In combination, a rotating axle, a sprocket wheel and a cam plate loose on the axle, a ratchet plate fixed to the axle between such parts, a spring for holding the cam plate in frictional driving contact with the ratchet plate, a pawl carried by the sprocket wheel engageable with the periphery of the ratchet plate, and a stop for arresting the rotation of the cam plate whereby the pawl is lifted out of contact with the ratchet plate by the cam plate.

2. In combination a rotating axle, a sprocket mounted thereon, a pawl carried by the sprocket, a ratchet plate fixed against rotation on the axle for engaging the pawl, a pawl raising cam having frictional driving connection with the axle, and means for arresting the rotation of the cam with the axle.

3. In combination, two parts coaxially mounted for independent rotation, a pawl carried by one of such parts, a ratchet wheel mounted to rotate with the other part, a pawl lifter having frictional driving connection with the last named part and means for arresting the movement of the pawl lifter.

4. In combination, a driving member, a driven member a pawl carried by the driven member for engaging the driving member, a pawl lifter having frictional driving connection with the driving member and means for arresting the movement of the pawl lifter.

5. In combination, a rotating axle, a sleeve fixed to the axle, the exterior of the sleeve being polygonal for a portion of its length and circular for the remaining portion of its length, a ratchet wheel seated on the polygonal portion of the sleeve, a circular hub formed on that side of the ratchet wheel remote from the circular portion of the sleeve, a gear wheel mounted on the hub of the ratchet wheel, a cam plate having a notched periphery mounted on the circular portion of the sleeve, one side of the plate being in contact with the side of the ratchet wheel, a washer fixed against longitudinal movement on the axle and turning with the cam plate, a spring reacting between the washer and the cam plate, a pawl carried by the gear wheel for engaging the ratchet wheel and a cam of the cam plate and a stop arm movable into and out of engagement with a notch of the cam plate.

JOHN C. POPE.
WILLIAM J. POPE.

Witnesses:
H. E. HENNING,
R. O. LEITCH.